United States Patent
DiBiasio et al.

(10) Patent No.: US 9,546,868 B2
(45) Date of Patent: Jan. 17, 2017

(54) MODAL DECOUPLING VIA FLEXURE-BASED TRANSMISSIONS AS APPLIED TO A MICROMACHINED TUNING FORK GYROSCOPE

(71) Applicant: THE CHARLES STARK DRAPER LABORATORY, INC., Cambridge, MA (US)

(72) Inventors: Christopher Michael DiBiasio, Stoughton, MA (US); Martin Luther Culpepper, Georgetown, MA (US); Marcel Thomas, Cambridge, MA (US); Robert Matthew Panas, Dublin, CA (US)

(73) Assignees: THE CHARLES STARK DRAPER LABORATORY, INC., Cambridge, MA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 143 days.

(21) Appl. No.: 14/340,042

(22) Filed: Jul. 24, 2014

(65) Prior Publication Data
US 2015/0168145 A1    Jun. 18, 2015

Related U.S. Application Data

(60) Provisional application No. 61/858,944, filed on Jul. 26, 2013.

(51) Int. Cl.
G01C 19/5607    (2012.01)
G01C 19/5747    (2012.01)
G01C 19/574     (2012.01)

(52) U.S. Cl.
CPC ......... *G01C 19/5607* (2013.01); *G01C 19/574* (2013.01); *G01C 19/5747* (2013.01)

(58) Field of Classification Search
None
See application file for complete search history.

(56) References Cited

U.S. PATENT DOCUMENTS

| | | | | |
|---|---|---|---|---|
| 5,635,638 A  * | 6/1997 | Geen | ................... | G01C 19/5719 73/504.12 |
| 5,635,639 A  * | 6/1997 | Greiff | ................ | G01C 19/5719 73/504.16 |
| 6,843,127 B1 * | 1/2005 | Chiou | ................ | G01C 19/5719 73/504.12 |
| 6,964,195 B2 * | 11/2005 | Hobbs | ................ | G01C 19/5719 73/504.12 |

(Continued)

*Primary Examiner* — Jill Culler
(74) *Attorney, Agent, or Firm* — Lando & Anastasi, LLP

(57) ABSTRACT

A gyroscope includes a first mass, a second mass, and a drive structure configured to drive each of the first mass and the second mass in a drive mode. The drive structure includes a first portion and a second portion, with the first portion being configured to drive the first mass in a direction along a drive axis and the second portion being configured to drive the second mass in a direction opposite to the first mass along the drive axis. The gyroscope further includes a sense structure configured to sense motion of each of the first mass and the second mass in a sense mode along a direction substantially perpendicular to the drive axis, and a plurality of flexures configured to couple the first portion to the second portion and further configured to decouple the drive mode and the sense mode.

17 Claims, 3 Drawing Sheets

(56) References Cited

U.S. PATENT DOCUMENTS

| | | | | |
|---|---|---|---|---|
| 7,043,985 B2* | 5/2006 | Ayazi | ............... | G01C 19/5719 |
| | | | | 73/504.12 |
| 7,159,460 B2* | 1/2007 | Nicu | ............... | G01C 19/5747 |
| | | | | 73/504.12 |
| 7,240,552 B2* | 7/2007 | Acar | ............... | G01C 19/5712 |
| | | | | 73/504.12 |
| 8,113,050 B2* | 2/2012 | Acar | ............... | G01C 19/574 |
| | | | | 73/504.12 |
| 8,453,504 B1* | 6/2013 | Mao | ............... | G01C 19/56 |
| | | | | 73/504.14 |
| 2010/0313657 A1* | 12/2010 | Trusov | ............... | G01C 19/5747 |
| | | | | 73/504.16 |

* cited by examiner

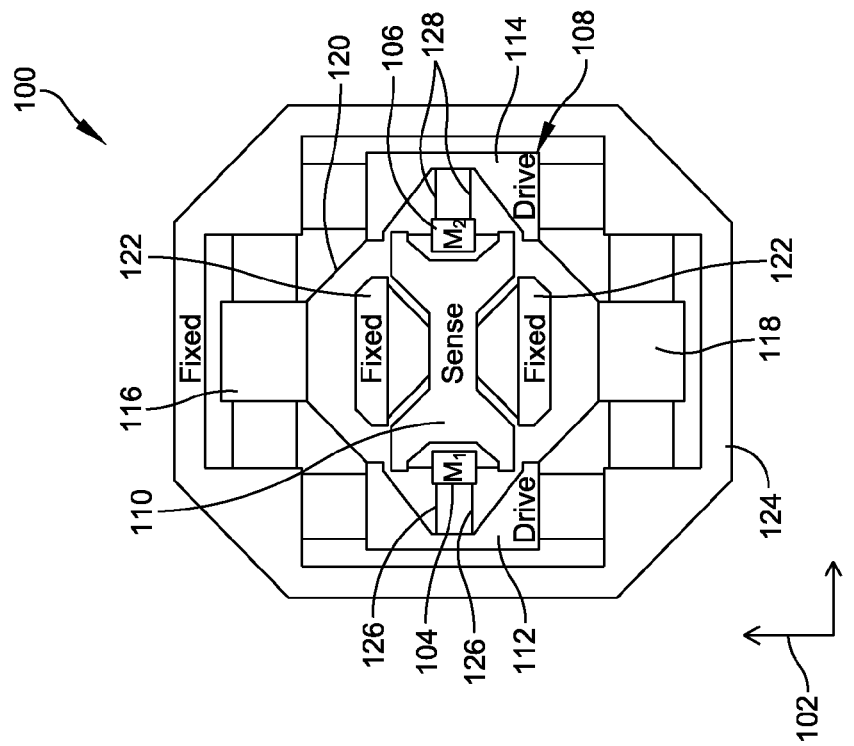
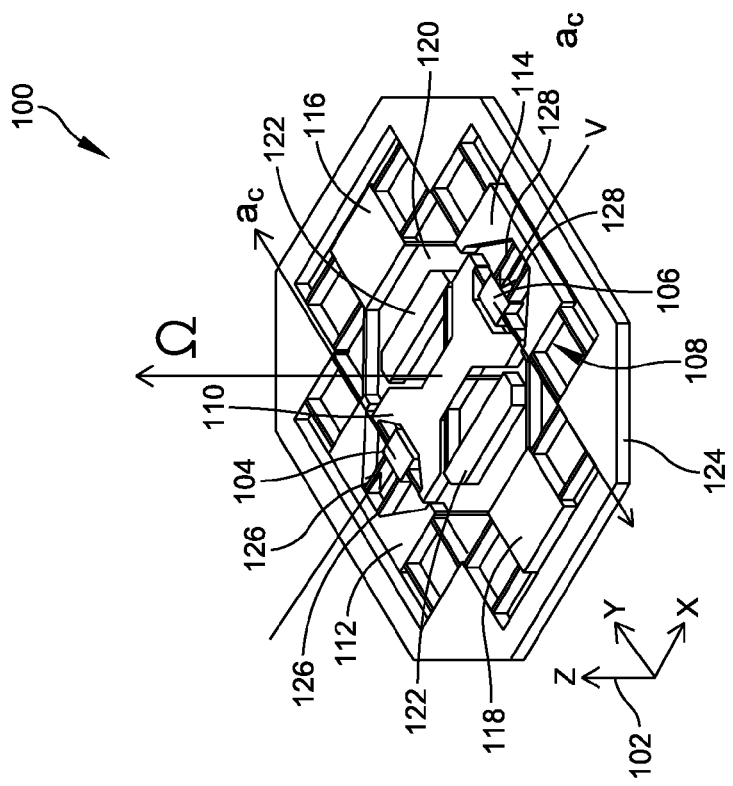

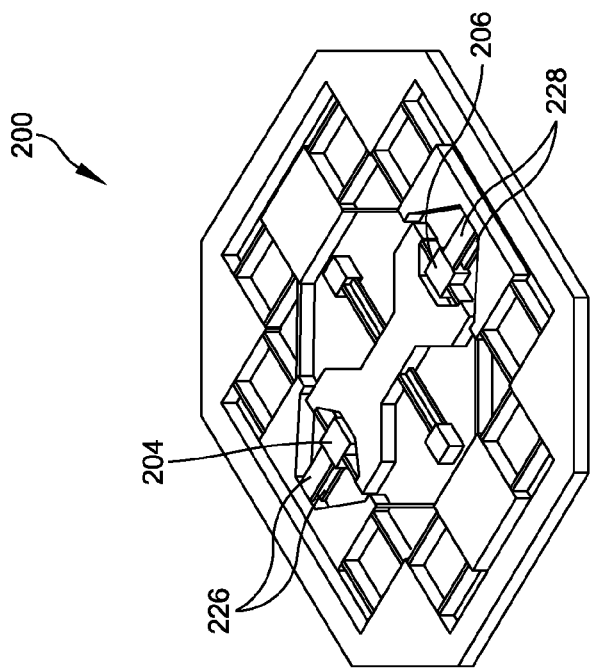
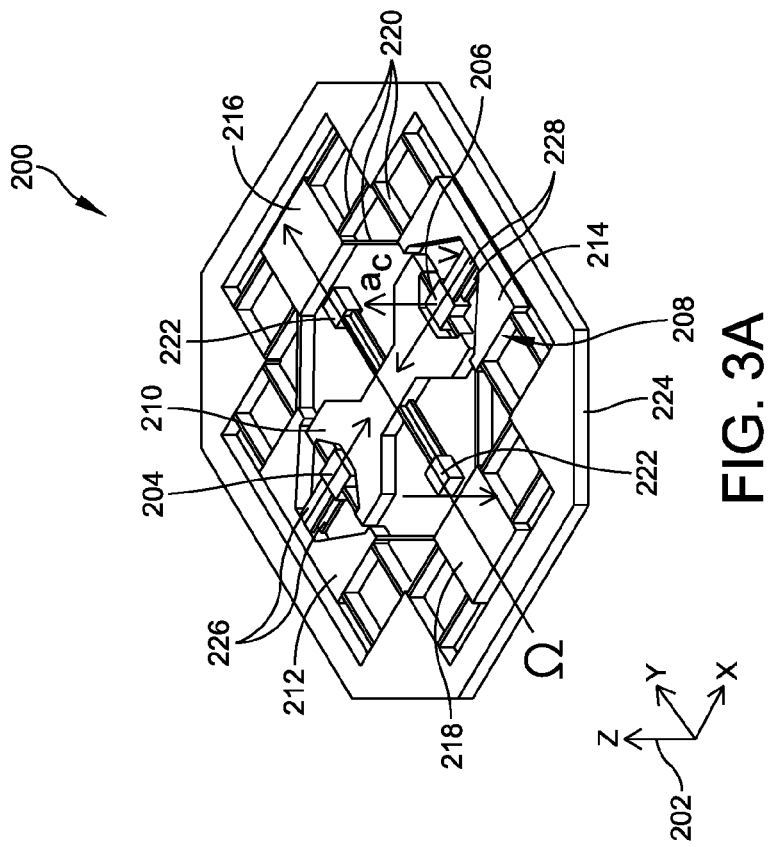
FIG. 3B
FIG. 3A

US 9,546,868 B2

MODAL DECOUPLING VIA FLEXURE-BASED TRANSMISSIONS AS APPLIED TO A MICROMACHINED TUNING FORK GYROSCOPE

CROSS REFERENCE TO RELATED APPLICATIONS

This application claims priority under 35 U.S.C. §119(e) to U.S. Provisional Application Ser. No. 61/858,944 entitled "MODAL DECOUPLING VIA FLEXURE-BASED TRANSMISSIONS AS APPLIED TO A MICROMACHINED TUNING FORK GYROSCOPE," filed on Jul. 26, 2014, which is incorporated herein by reference in its entirety.

BACKGROUND

The present disclosure generally relates to gyroscopes and more specifically to tuning fork gyroscopes (TFG).

Operation of a tuning fork gyroscope may be based on the Coriolis effect, wherein a mass moving at a given velocity will experience Coriolis acceleration when the mass is also rotated with an angular velocity. The Coriolis acceleration is perpendicular to the velocity and the angular velocity. The Coriolis acceleration vector is given by $a_c = -2(v \times \Omega)$, where v is the velocity vector and $\Omega$ is the angular velocity vector. Coriolis acceleration is thus indicative of the angular velocity of rotation.

SUMMARY OF THE INVENTION

According to aspects of the present disclosure, it is appreciated that there are two inherent issues with the design of state-of-the art tuning fork gyroscopes that limit their performance and insensitivity to manufacturing errors. First, tuning fork gyroscopes have undesired modes in close proximity to desired modes with high coupling between desired and undesired modes. Second, the flexure bearings in tuning fork gyroscopes have been designed as springs rather than flexures. These flexure bearings are under-constrained, and therefore sensitive to disturbance accelerations and undesired rotations (for example, rotations about axes that are not being measured). As a result, tuning fork gyroscopes must be manufactured to tight and expensive tolerances.

Aspects and embodiments disclosed herein are directed to providing gyroscopes that address the above limitations such as the inherent problems of under-constraint, sensitivity to disturbance accelerations and sensitivity to manufacturing imprecision. Various embodiments disclosed herein exhibit decoupled mode shapes and a larger separation, such as in a range of 10% to 300%, of desired and undesired modes. Various embodiments may provide tunable separation between desired and undesired modes. In some embodiments, gyroscopes disclosed herein may be microelectromechanical systems or MEMS gyroscopes. In other embodiments, the gyroscopes may be micro- or conventionally machined.

Aspects and embodiments disclosed herein are also directed to methods of designing gyroscopes having one or more features disclosed herein. In one example, the method may include application of the Freedom and Constraint Topology (FACT) design method to generate a configuration of flexures of a tuning fork gyroscope that allows modal decoupling.

One aspect of the present disclosure is directed to a gyroscope comprising a first mass, a second mass, and a drive structure configured to drive each of the first mass and the second mass in a drive mode. The drive structure includes a first portion and a second portion, with the first portion being configured to drive the first mass in a direction along a drive axis and the second portion being configured to drive the second mass in a direction opposite to the first mass along the drive axis. The gyroscope further comprises a sense structure configured to sense motion of each of the first mass and the second mass in a sense mode along a direction substantially perpendicular to the drive axis, and a plurality of flexures configured to couple the first portion to the second portion and further configured to decouple the drive mode and the sense mode.

Embodiments of the gyroscope further may include the drive structure having a third portion coupled to the first portion and the second portion by a first subset of the plurality of flexures. The drive structure further may include includes a fourth portion coupled to the first portion and the second portion by a second subset of the plurality of flexures. The first portion and the second portion may be arranged along the drive axis in a plane of the gyroscope and the third portion and the fourth portion are arranged substantially perpendicular to the drive axis in the plane. The third portion may be configured to move towards the fourth portion substantially perpendicular to the drive axis in response to the first portion moving away from the second portion along the drive axis. The gyroscope further may include an anchor positioned around the drive structure, at least some flexures of the plurality of flexures being coupled to the anchor. The gyroscope may be a planar gyroscope, with the drive structure and the sense structure being disposed in a plane of the gyroscope and the plurality of flexures being oriented substantially perpendicular to the plane. The gyroscope further may include at least one flexure configured to couple the first mass to the first portion, the at least one flexure being oriented substantially perpendicular to the plane. The at least one flexure may be configured to allow displacement of the first mass along the drive axis and along the direction substantially perpendicular to the drive axis in the plane of the gyroscope. The at least one flexure may be further configured to be stiff to motion of the first mass in other directions. The gyroscope further may include at least one other flexure configured to couple the second mass to the second portion, with the at least one other flexure being oriented substantially perpendicular to the plane and being configured to allow displacement of the second mass along the drive axis and along the direction substantially perpendicular to the drive axis in the plane of the gyroscope. The gyroscope further may include at least one flexure configured to couple the first mass to the first portion, the at least one flexure being oriented substantially parallel to the plane. The at least one flexure may be configured to be compliant to allow displacement of the first mass along the drive axis and along the direction substantially perpendicular to the drive axis out of the plane of the gyroscope and further configured to be stiff to motion of the first mass in other directions. The gyroscope further may include at least one other flexure configured to couple the second mass to the second portion, with the at least one other flexure being oriented substantially parallel to the plane and being configured to be compliant to displacement of the second mass along the drive axis and along the direction substantially perpendicular to the drive axis out of the plane of the gyroscope. In one embodiment, the gyroscope may be a macromachined gyroscope. In another embodiment, the gyroscope may be a MEMS gyroscope. The sense structure may include a first prong coupled to the first mass and a second prong coupled to the second mass. The sense structure may be coupled to a first anchor and centered in a plane of the gyroscope and the drive structure is disposed around the sense structure, the drive structure being coupled to a second anchor by at least one of the plurality of flexures. The drive structure may be decoupled from the sense structure. Each of the drive mode and the sense mode may be independently tunable.

Various aspects, embodiments, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1A is a perspective view of one embodiment of a gyroscope configured according to aspects of the present invention;

FIG. 1B is a top view of the gyroscope of FIG. 1A according to aspects of the present invention;

FIG. 3A is a perspective view of another embodiment of a gyroscope according to aspects of the present invention; and FIG. 3B is the perspective view of the gyroscope of FIG. 3A, further highlighting the configuration of flexures coupling each mass to the drive structure according to aspects of the present invention.

DETAILED DESCRIPTION

Figure 2A:
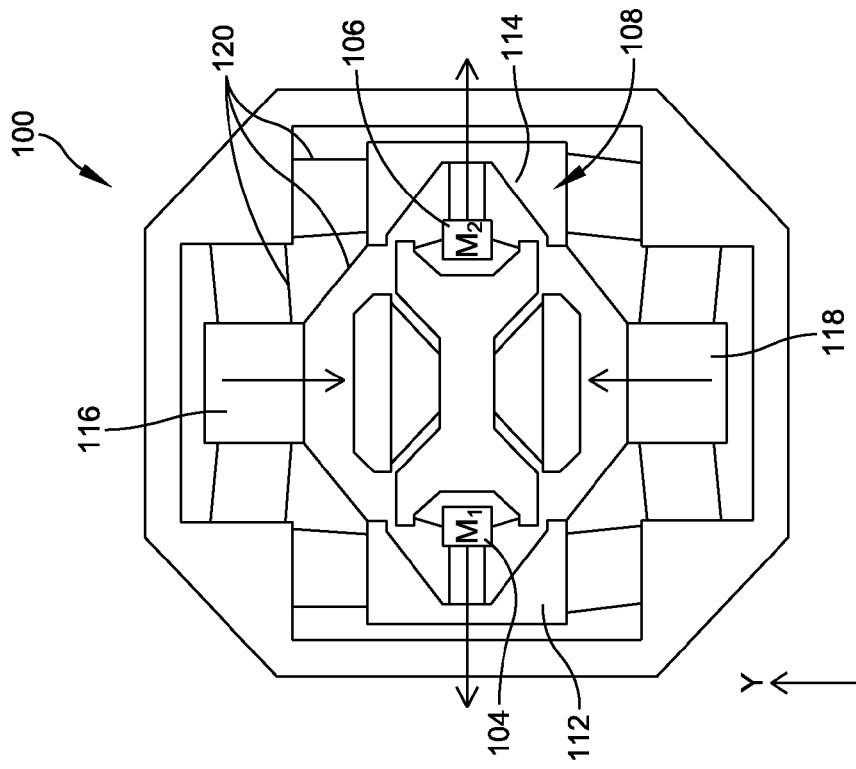
FIG. 2A is a top view of the gyroscope of FIG. 1A, illustrating the sense mode according to aspects of the present invention.

According to aspects of the present disclosure, it is appreciated that tuning fork gyroscopes may typically have a flexure layout that couples the sense and drive motions. Furthermore, the proof masses in tuning fork gyroscopes are typically not exactly constrained and are thus susceptible to cross-axis inputs and manufacturing errors.

Aspects and embodiments are directed to providing a new solid-state gyroscope architecture that mechanically decouples the sense and drive modes. The new architecture substantially eliminates mechanical cross-talk between these modes and also provides high mechanical rejection of cross-axis rates and accelerations. Embodiments of gyroscopes disclosed herein allow a reduction in bias drift and scale factor errors and also reduce sensitivity to manufacturing errors. In one example, flexural bearings of embodiments disclosed herein may be designed using the Freedom and Constraint Topology (FACT) method.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring now to the drawings, FIGS. 1A and 1B illustrate one example of a gyroscope 100 configured according to aspects of the present disclosure. FIG. 1A is a perspective view of the gyroscope 100 and FIG. 1B is a top view of the gyroscope 100. The gyroscope 100 is a planar gyroscope. In FIG. 1A, the gyroscope 100 is oriented such that the plane of the gyroscope is substantially parallel to the x-y plane of the reference frame 102. The gyroscope 100 includes a plurality of proof masses. As shown in FIGS. 1A and 1B, the gyroscope 100 includes a first mass 104 ($M_1$) and a second mass 106 ($M_2$) and further includes a drive structure 108 and a sense structure 110. In various embodiments, the drive structure 108 is decoupled from the sense structure 110.

The drive structure 108 is configured to drive each of the first mass 104 and the second mass 106 in a drive mode. The drive structure 108 includes a first portion 112, a second portion 114, a third portion 116 and a fourth portion 118. In other embodiments, the drive structure 108 may include a different number of portions. The first portion 112 is configured to drive the first mass 104 and the second portion 114 is configured to drive the second mass 106. The first mass 104 and the second mass 106 are driven along a drive axis as indicated by the velocity vectors v in FIG. 1A. In this example, the drive axis is parallel to the x-axis. The masses are driven in opposite directions. In one example, the masses may be driven by electrostatic comb drives at a velocity v, but in opposite directions.

The sense structure 110 is configured to sense motion of each of the first mass 104 and the second mass 106 in a sense mode along a direction substantially perpendicular to the drive axis. In FIG. 1A, as the gyroscope is subjected to rotation with an angular velocity Ω parallel to the z-axis, each of the first mass and the second mass experiences Coriolis acceleration $a_c$ as indicated by the arrows in a direction parallel to the y-axis. The Coriolis acceleration vector is perpendicular to the velocity vector v and the angular velocity vector Ω. The masses 104 and 106 may be mounted on springs. The Coriolis force causes a displacement of the masses that may be measured. In one example, displacement may be measured with capacitive sensing.

The sense structure 110 is configured to sense motion of each of the first mass 104 and the second mass 106 in a sense mode along a direction substantially perpendicular to the drive axis, i.e. along the direction of the Coriolis acceleration vector which is parallel to the y-axis in the example of FIGS. 1A and 1B. In some embodiments, as shown in FIGS. 1A and 1B, the sense structure 110 may include a first prong coupled to the first mass and a second prong coupled to the second mass.

The gyroscope 100 further includes a plurality of flexures 120 configured to couple the first portion 112 of the drive structure 108 to the second portion 114 of the drive structure and further configured to decouple the drive mode and the sense mode. In the embodiment shown in FIGS. 1A and 1B, the drive structure 108 further includes a third portion 116 and a fourth portion 118. The third portion 116 is coupled to the first portion 112 and the second portion 114 by a first subset of the plurality of flexures 120. The fourth portion 118 is coupled to the first portion 112 and the second portion 114 by a second subset of the plurality of flexures 120. The first portion 112 and the second portion 114 are arranged along the drive axis (i.e. the x-axis in this example) in the plane of the gyroscope. The third portion 116 and the fourth portion 118 are arranged substantially perpendicular to the drive axis (i.e. along the y-axis in this example) in the plane of the gyroscope.

As the first portion 112 and the second portion 114 move opposite to each other along the drive axis, the plurality of flexures 120 coupling the various portions of the drive structure 108 allow the third portion 116 and the fourth portion 118 to move opposite to each other. The plurality of flexures 120 are configured such that the third portion 116 and the fourth portion 118 move towards each other as the first portion 112 and the second portion 114 move away from each other along the drive axis. Furthermore, the plurality of flexures 120 are configured such that the third portion 116 and the fourth portion 118 move away from each other as the first portion 112 and the second portion 114 move towards each other along the drive axis. Other configurations of the drive structure and drive modes may be feasible in various embodiments.

The gyroscope 100 further includes a first anchor 122 and a second anchor 124. The gyroscope 100 may be arranged in a substantially concentric configuration, as shown for example in FIGS. 1A and 1B. The sense structure 110 is substantially centered in the plane of the gyroscope 100 and coupled to the first anchor 122. The drive structure 108 is arranged around the sense structure 110 such that the drive and sense modes are decoupled. The second anchor 124 is arranged around the drive structure 108. The drive structure 108 is coupled to the second anchor 124 by a plurality of flexures 120. In various embodiments, the drive structure may be coupled to the second anchor by at least one flexure. Other configurations and arrangements of one or more anchors relative to the sense structure, the drive structure and the plurality of flexures may be possible in various embodiments.

In various embodiments, as shown for example in FIGS. 1A and 1B, the gyroscope may be a planar gyroscope. The drive structure 108 and the sense structure 110 may be disposed in the plane of the gyroscope. The plurality of flexures 120 may be oriented substantially perpendicular to the plane of the gyroscope as shown for example in the perspective view in FIG. 1A. In this example, each flexure is planar, with the plane of each flexure being oriented substantially perpendicular to the plane of the gyroscope.

The gyroscope 100 further comprises at least one flexure 126 configured to couple the first mass 104 to the first portion 112. Two flexures 126 are illustrated in the embodiment of FIGS. 1A and 1B. The flexures 126 are oriented substantially perpendicular to the plane of the gyroscope 100. In this example, the plane of the gyroscope is parallel to the x-y plane. The flexures 126 are configured to allow displacement of the first mass 104 along the drive axis (parallel to the x-axis) and also along the direction substantially perpendicular to the drive axis in the plane of the gyroscope (that is, parallel to the y-axis). In some embodiments, the flexures 126 may be configured to be stiff to motion of the first mass 104 in other directions.

The gyroscope 100 further comprises at least one other flexure 128 configured to couple the second mass 106 to the second portion 114. Two flexures 128 are illustrated in the embodiment of FIGS. 1A and 1B. The flexures 128 are oriented substantially perpendicular to the plane of the gyroscope 100. The flexures 128 are configured to allow displacement of the second mass 106 along the drive axis (parallel to the x-axis) and also along the direction substantially perpendicular to the drive axis in the plane of the gyroscope (that is, parallel to the y-axis). In some embodiments, the flexures 128 may be configured to be stiff to motion of the second mass 106 in other directions. Other embodiments of gyroscopes disclosed herein may be configured to measure acceleration along other axes and may include flexures configured to allow displacement along other axes, as discussed further below with reference to the embodiment shown in FIGS. 3A and 3B.

In various embodiments disclosed herein, the gyroscope may be a MEMS gyroscope. In some embodiments, the gyroscope may be a macromachined gyroscope. In various embodiments, the gyroscope may be a tuning fork gyroscope.

Figure 2B:
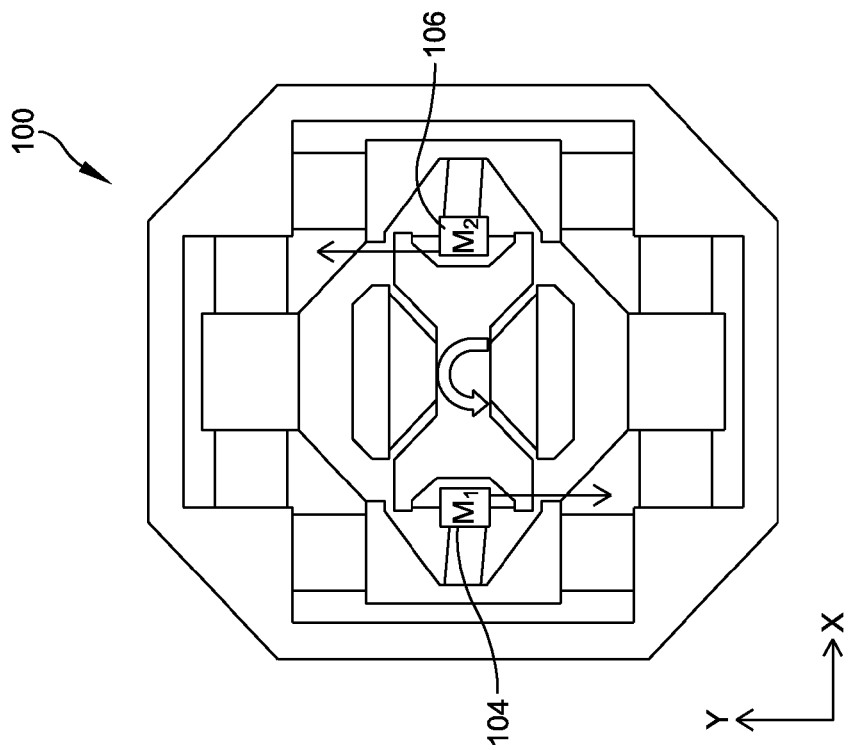
FIG. 2B is a top view of the gyroscope of FIG. 1A, illustrating the drive mode according to aspects of the present invention.

FIG. 2A illustrates the sense mode of the gyroscope 100 and FIG. 2B illustrates the drive mode of the gyroscope 100. FIG. 2A illustrates a sense mode shape wherein one mass moves in the +y direction and another mass moves in the −y direction. FIG. 2B illustrates a drive mode shape wherein one mass moves in the +x direction and the other mass moves in the −x direction. As the masses move in opposite directions along the drive axis which is parallel to the x-axis, the third portion 116 and the fourth portion 118 move in opposite directions substantially perpendicular to the drive axis, that is parallel to the y-axis. The motion for the drive and sense mode shapes are kinematically decoupled. In some embodiments, the drive and sense modes may be independently tunable, for example by changing the flexures responsible for their specific kinematics. In one example, flexures may be adjusted to tune the sense mode or the drive mode so as to achieve a desired performance of the gyroscope.

FIGS. 3A and 3B show another embodiment of a gyroscope 200 configured according to aspects disclosed herein. The gyroscope 200 is oriented such that the plane of the gyroscope is substantially parallel to the x-y plane of the reference frame 202. The gyroscope 200 is configured similarly to the gyroscope 100 of FIGS. 1A and 1B. For example, the gyroscope 200 includes a first mass 204 and a second mass 206 and further includes a drive structure 208, a sense structure 210 and a plurality of flexures 220. However, the gyroscope 200 is configured to measure acceleration along a different axis than the gyroscope 100 of FIGS. 1A and 1B.

The drive structure 208 is configured to drive each of the first mass 204 and the second mass 206 in a drive mode. The drive structure 208 includes a first portion 212, a second portion 214, a third portion 216 and a fourth portion 218. In other embodiments, the drive structure 208 may include a different number of portions. The first portion 212 is configured to drive the first mass 204 and the second portion 214 is configured to drive the second mass 206. The first mass 204 and the second mass 206 are driven along a drive axis as indicated by the velocity vectors v in FIG. 3A. In this example, the drive axis is parallel to the x-axis. The masses are driven in opposite directions. In one example, the masses may be driven by electrostatic comb drives at a velocity v, but in opposite directions.

The sense structure 210 is configured to sense motion of each of the first mass 204 and the second mass 206 in a sense mode along a direction substantially perpendicular to the drive axis. In the embodiment of FIG. 3A, as the gyroscope is subjected to rotation with an angular velocity Ω parallel to the y-axis, each of the first mass and the second mass experiences Coriolis acceleration $a_c$ as indicated by the arrows in a direction parallel to the z-axis. The Coriolis acceleration vector is perpendicular to the velocity vector v and the angular velocity vector Ω. The masses 204 and 206 may be mounted on springs. The Coriolis force causes a displacement of the masses that may be measured. In one example, displacement may be measured with capacitive sensing.

The sense structure 210 is configured to sense motion of each of the first mass 204 and the second mass 206 in a sense mode along a direction substantially perpendicular to the drive axis, i.e. along the direction of the Coriolis acceleration vector which is parallel to the z-axis, out of the plane of the gyroscope 200 in the example of FIGS. 3A and 3B. In this example, the sense structure 210 includes a first prong coupled to the first mass and a second prong coupled to the second mass.

The gyroscope 200 further includes a plurality of flexures 220 configured to couple the first portion 212 of the drive structure 208 to the second portion 214 of the drive structure and further configured to decouple the drive mode and the sense mode. The drive structure 208 further includes a third portion 216 and a fourth portion 218. The third portion 216 is coupled to the first portion 212 and the second portion 214 by a first subset of the plurality of flexures 220. The fourth portion 218 is coupled to the first portion 212 and the second portion 214 by a second subset of the plurality of flexures 220. The first portion 212 and the second portion 214 are arranged along the drive axis (i.e. the x-axis in this example) in the plane of the gyroscope. The third portion 216 and the fourth portion 218 are arranged substantially perpendicular to the drive axis (i.e. along the y-axis in this example) in the plane of the gyroscope.

As the first portion 212 and the second portion 214 move opposite to each other along the drive axis, the plurality of flexures 220 coupling the various portions of the drive structure 208 allow the third portion 216 and the fourth portion 218 to move opposite to each other. The plurality of flexures 220 are configured such that the third portion 216 and the fourth portion 218 move towards each other as the first portion 212 and the second portion 214 move away from each other along the drive axis. Furthermore, the plurality of flexures 220 are configured such that the third portion 216 and the fourth portion 218 move away from each other as the first portion 212 and the second portion 214 move towards each other along the drive axis.

The gyroscope 200 further includes a first anchor 222 and a second anchor 224. The sense structure 210 is substantially centered in the plane of the gyroscope 200 and coupled to the first anchor 222. The drive structure 208 is arranged around the sense structure 210 such that the drive and sense modes are decoupled. The second anchor 224 is arranged around the drive structure 208. The drive structure 208 is coupled to the second anchor 224 by a plurality of flexures 220. In various embodiments, the drive structure may be coupled to the second anchor by at least one flexure. Other configurations and arrangements of one or more anchors relative to the sense structure, the drive structure and the plurality of flexures may be possible in various embodiments.

In the embodiment of FIGS. 3A and 3B, the gyroscope 200 is a planar gyroscope, the drive structure 208 and the sense structure 210 being disposed in the plane of the gyroscope. The plurality of flexures 220 that are coupled to the drive structure 208 are oriented substantially perpendicular to the plane of the gyroscope as shown in FIGS. 3A and 3B. In this example, each of the plurality of flexures is planar, with the plane of each flexure being oriented substantially perpendicular to the plane of the gyroscope.

The gyroscope 200 further comprises at least one flexure 226 configured to couple the first mass 204 to the first portion 212 and at least one flexure 228 configured to couple the second mass 206 to the second portion 214. FIG. 3B further illustrates the flexures 226 and 228 that couple the masses to the drive structure 208. In contrast with the embodiment of FIGS. 1A and 1B where the two flexures 126 are oriented substantially perpendicular to the plane of the gyroscope 100, the flexures 226 and 228 are oriented substantially parallel to the plane of the gyroscope 200. In this example, the plane of the gyroscope is parallel to the x-y plane.

The flexures 226 are configured to allow displacement of the first mass 204 along the drive axis (parallel to the x-axis) and also along the direction substantially perpendicular to the drive axis out of the plane of the gyroscope (that is, parallel to the z-axis). In some embodiments, the flexures 226 may be configured to be stiff to motion of the first mass 204 in other directions. Similarly, the flexures 228 are configured to allow displacement of the second mass 206 along the drive axis (parallel to the x-axis) and also along the direction substantially perpendicular to the drive axis out of the plane of the gyroscope (that is, parallel to the z-axis). In some embodiments, the flexures 228 may be configured to be stiff to motion of the second mass 206 in other directions.

Each of the embodiments described above with reference to FIGS. 1A and 1B and FIGS. 3A and 3B are an alternate way to decouple sense and drive mode shapes while coupling mass motions. In one example, the embodiment of FIGS. 1A and 1B may be micro-scale machined. In another example, the embodiment of FIGS. 3A and 3B may be meso-scale machined. In yet another example, the embodiment of FIGS. 3A and 3B may be macro-scale machined.

Various embodiments disclosed herein provide several advantages. One advantage is that sense and drive modes are mechanically decoupled. Various embodiments may allow separation of desired and undesired modes by 10-300%. Another advantage is high rejection of cross-axis inputs. As described with reference to various embodiments, the layout of the flexures may be configured to be mechanically sensitive only to the sense and drive modes and not other inputs, thereby leading to a very high rejection of cross-axis inputs. Yet another advantage is increased tolerance to manufacturing errors. While traditional tuning fork gyroscopes are very sensitive to errors in the manufacturing of flexure bearings because of inherent underconstraint and coupling in the flexure architecture, various embodiments disclosed herein may exactly constrain the flexures, thereby reducing the sensitivity to manufacturing errors.

According to other aspects, various methods of providing or operating gyroscopes configured according to one or more features disclosed herein are within the scope of this disclosure. In one example, a method of providing a gyroscope, such as the gyroscope 100 or the gyroscope 200 described above with reference to FIGS. 1A, 1B, 3A and 3B may include applying the Freedom and Constraint Topology (FACT) design method. FACT is a design method for flexure systems that combines exact constraint theory and screw theory. Applying FACT may provide a configuration of flexures for a specified set of desired and undesired motions. In various embodiments, FACT may also be used to create flexural transmissions that can change an input type, transmission ratio, and direction.

Various embodiments of systems and methods disclosed herein may have applications in various fields. Applications may encompass the field of precision inertial guidance and navigation. For example, embodiments may be used to guide platforms such as strategic missiles, submarines, Unmanned Underwater Vehicles (UUV), Unmanned Aerial Vehicles (UAV), cruise missiles, aircraft, and tactical munitions. Other examples of applications may include commercial aviation, self-driving vehicles, robotic machinery, personal navigation and consumer electronics such as various computing devices and mobile communication devices.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

The invention claimed is:

1. A gyroscope comprising:
a first mass and a second mass;
a drive structure configured to drive each of the first mass and the second mass in a drive mode, the drive structure including a first portion and a second portion, the first portion being configured to drive the first mass in a direction along a drive axis and the second portion being configured to drive the second mass in a direction opposite to the first mass along the drive axis;
a sense structure configured to sense motion of each of the first mass and the second mass in a sense mode along a direction substantially perpendicular to the drive axis; and
a plurality of flexures configured to couple the first portion to the second portion and further configured to decouple the drive mode and the sense mode,
wherein the gyroscope is a planar gyroscope, the drive structure and the sense structure being disposed in a plane of the gyroscope and the plurality of flexures being oriented substantially perpendicular to the plane, wherein at least one flexure is configured to couple the first mass to the first portion, the at least one flexure being oriented substantially parallel to the plane, and
wherein the at least one flexure is configured to be compliant to allow displacement of the first mass along the drive axis and along the direction substantially perpendicular to the drive axis out of the plane of the gyroscope and further configured to be stiff to motion of the first mass in other directions.

2. The gyroscope of claim 1, wherein the drive structure further includes a third portion coupled to the first portion and the second portion by a first subset of the plurality of flexures.

3. The gyroscope of claim 2, wherein the drive structure further includes a fourth portion coupled to the first portion and the second portion by a second subset of the plurality of flexures.

4. The gyroscope of claim 3, wherein the first portion and the second portion are arranged along the drive axis in a plane of the gyroscope and the third portion and the fourth portion are arranged substantially perpendicular to the drive axis in the plane.

5. The gyroscope of claim 4, wherein the third portion is configured to move towards the fourth portion substantially perpendicular to the drive axis in response to the first portion moving away from the second portion along the drive axis.

6. The gyroscope of claim 4, further comprising an anchor positioned around the drive structure, at least some flexures of the plurality of flexures being coupled to the anchor.

7. The gyroscope of claim 1, further comprising at least one flexure configured to couple the first mass to the first portion, the at least one flexure being oriented substantially perpendicular to the plane.

8. The gyroscope of claim 7, wherein the at least one flexure is configured to allow displacement of the first mass along the drive axis and along the direction substantially perpendicular to the drive axis in the plane of the gyroscope.

9. The gyroscope of claim 8, wherein the at least one flexure is further configured to be stiff to motion of the first mass in other directions.

10. The gyroscope of claim 8, further comprising at least one other flexure configured to couple the second mass to the second portion, the at least one other flexure being oriented substantially perpendicular to the plane and being configured to allow displacement of the second mass along the drive axis and along the direction substantially perpendicular to the drive axis in the plane of the gyroscope.

11. The gyroscope of claim 1, further comprising at least one other flexure configured to couple the second mass to the second portion, the at least one other flexure being oriented substantially parallel to the plane and being configured to be compliant to displacement of the second mass along the drive axis and along the direction substantially perpendicular to the drive axis out of the plane of the gyroscope.

12. The gyroscope of claim 1, wherein the gyroscope is a macromachined gyroscope.

13. The gyroscope of claim 1, wherein the gyroscope is a MEMS gyroscope.

14. The gyroscope of claim 1, wherein the sense structure includes a first prong coupled to the first mass and a second prong coupled to the second mass.

15. The gyroscope of claim 1, wherein the sense structure is coupled to a first anchor and centered in a plane of the gyroscope and the drive structure is disposed around the sense structure, the drive structure being coupled to a second anchor by at least one of the plurality of flexures.

16. The gyroscope of claim 1, wherein the drive structure is decoupled from the sense structure.

17. The gyroscope of claim 1, wherein each of the drive mode and the sense mode is independently tunable.

* * * * *